United States Patent
Albinus et al.

(10) Patent No.: US 11,987,528 B2
(45) Date of Patent: May 21, 2024

(54) PROCESS FOR HYDROPHOBIZING SHAPED INSULATION-MATERIAL BODIES BASED ON SILICA AT AMBIENT PRESSURE

(71) Applicant: Kingspan Insulation Limited, Leominster (GB)

(72) Inventors: Uwe Albinus, Bad Vilbel (DE); Jürgen Meyer, Stockstadt (DE); Gabriele Gartner, Nidderau (DE)

(73) Assignee: Kingspan Insulation Limited, Leominster (GB)

( * ) Notice: Subject to any disclaimer, the term of this patent is extended or adjusted under 35 U.S.C. 154(b) by 0 days.

(21) Appl. No.: 17/260,371

(22) PCT Filed: Jul. 8, 2019

(86) PCT No.: PCT/EP2019/068194
§ 371 (c)(1),
(2) Date: Jan. 14, 2021

(87) PCT Pub. No.: WO2020/016036
PCT Pub. Date: Jan. 23, 2020

(65) Prior Publication Data
US 2021/0292238 A1 Sep. 23, 2021

(30) Foreign Application Priority Data
Jul. 18, 2018 (EP) .................................. 18184079

(51) Int. Cl.
C04B 30/02 (2006.01)
C04B 40/00 (2006.01)
C04B 111/52 (2006.01)

(52) U.S. Cl.
CPC .......... *C04B 30/02* (2013.01); *C04B 40/0071* (2013.01); *C04B 2111/52* (2013.01)

(58) Field of Classification Search
CPC ..... C04B 24/42; C04B 14/064; C04B 14/066; C04B 14/18; C04B 14/302; C04B 14/028; C04B 30/00; C04B 30/02; C04B 14/022; C04B 14/024; C04B 14/046; C04B 14/306; C04B 14/308; C04B 14/324; C04B 2103/56; C04B 14/305; C04B 2111/27; C04B 2111/28; C04B 2111/52; C04B 40/0071
See application file for complete search history.

(56) References Cited

U.S. PATENT DOCUMENTS

| | | | |
|---|---|---|---|
| 2,595,262 A | 5/1952 | Hood | |
| 3,532,473 A | 10/1970 | Biegler et al. | |
| 3,574,027 A | 4/1971 | Bonnet | |
| 4,048,290 A | 9/1977 | Lee | |
| 4,175,159 A | 11/1979 | Raleigh | |
| 4,212,925 A | 7/1980 | Kratel et al. | |
| 4,247,708 A | 1/1981 | Tsutsumi et al. | |
| 4,276,274 A | 6/1981 | Heckel | |
| 4,286,990 A | 9/1981 | Kleinschmidt et al. | |
| 4,297,143 A | 10/1981 | Kleinschmidt et al. | |
| 5,086,031 A | 2/1992 | Deller et al. | |
| 5,183,710 A | 2/1993 | Gerbino | |
| 5,362,541 A | 11/1994 | Sextl et al. | |
| 5,458,916 A | 10/1995 | Kratel et al. | |
| 5,556,689 A | 9/1996 | Kratel et al. | |
| 5,565,142 A | 10/1996 | Deshpande et al. | |
| 5,589,245 A | 12/1996 | Roell | |
| 5,685,932 A | 11/1997 | Stohr et al. | |
| 5,776,240 A | 7/1998 | Deller et al. | |
| 5,851,715 A | 12/1998 | Barthel et al. | |
| 6,099,749 A | 8/2000 | Boes et al. | |
| 6,174,926 B1 | 1/2001 | Menon et al. | |
| 6,268,423 B1 | 7/2001 | Mayer et al. | |
| 6,303,256 B1 | 10/2001 | Kerner et al. | |
| 6,472,067 B1 | 10/2002 | Hsu et al. | |

(Continued)

FOREIGN PATENT DOCUMENTS

| | | |
|---|---|---|
| CA | 2 201 186 | 9/1997 |
| CN | 106830878 | 6/2017 |

(Continued)

OTHER PUBLICATIONS

EP1988228A2—description 2008.*
EP199228A2—claims 2008.*
International Search Report for corresponding PCT/EP2019/068194 filed Jul. 8, 2019.
English language translation of the Written Opinion of the International Searching Authority for corresponding PCT/EP2019/068194 filed Jul. 8, 2019.
English language translation of the International Preliminary Report on Patentability for for corresponding PCT/EP2019/068194 filed Jul. 8, 2019.

(Continued)

Primary Examiner — Shuangyi Abu Ali
(74) Attorney, Agent, or Firm — Harness, Dickey & Pierce, P.L.C.

(57) ABSTRACT

The present invention relates to a process for producing a hydrophobized shaped thermal-insulation body, comprising pressing or compacting a thermal-insulation mixture containing a silica, an IR opacifier, an organosilicon compound A and an organosilicon compound B, wherein organosilicon compound A is hexamethyldisilazane (HMDS) and organosilicon compound B corresponds to a substance of the formula $R_nSiX_{4-n}$, where R=hydrocarbyl radical having 1 to 18 carbon atoms, n=0, 1 or 2, X=Cl, Br or alkoxy group —$OR^1$ where $R^1$=hydrocarbyl radical having 1 to 8 carbon atoms, or organosilicon compound B corresponds to a silanol of the formula $HO[-Si(CH_3)_2O-]_mH$, where m=2-100.

10 Claims, No Drawings

(56) References Cited

U.S. PATENT DOCUMENTS

| | | |
|---|---|---|
| 7,241,336 B2 | 7/2007 | Scharfe et al. |
| 7,562,534 B2 | 7/2009 | Jibb et al. |
| 7,674,476 B1 | 3/2010 | Schwertfeger et al. |
| 7,780,937 B2 | 8/2010 | Meyer et al. |
| 7,842,269 B2 | 11/2010 | Schachtely et al. |
| 7,855,248 B2 | 12/2010 | Stenzel et al. |
| 8,333,946 B2 | 12/2012 | Gottschalk et al. |
| 8,389,617 B2 | 3/2013 | Meyer et al. |
| 8,512,595 B2 | 8/2013 | Meyer et al. |
| 8,603,353 B2 | 12/2013 | Menzel et al. |
| 8,962,519 B2 | 2/2015 | Heindl et al. |
| 9,055,748 B2 | 6/2015 | Feucht et al. |
| 9,233,986 B2 | 1/2016 | Kratel et al. |
| 9,540,247 B2 | 1/2017 | Stenzel et al. |
| 9,593,797 B2 | 3/2017 | Kulprathipanja et al. |
| 9,770,848 B2 | 9/2017 | Baek et al. |
| 9,784,402 B2 | 10/2017 | Menzel |
| 9,878,911 B2 | 1/2018 | Maisels et al. |
| 10,179,751 B2 | 1/2019 | Geisler et al. |
| 10,618,815 B2 | 4/2020 | Hindelang et al. |
| 10,618,849 B2 | 4/2020 | Albinus et al. |
| 11,427,506 B2 | 8/2022 | Schultz et al. |
| 2003/0095905 A1 | 5/2003 | Scharfe et al. |
| 2006/0027227 A1 | 2/2006 | Everett et al. |
| 2007/0220904 A1 | 9/2007 | Jibb et al. |
| 2008/0277617 A1 | 11/2008 | Abdul-Kader et al. |
| 2010/0146992 A1 | 6/2010 | Miller |
| 2010/0300132 A1 | 12/2010 | Schultz |
| 2012/0064345 A1 | 3/2012 | Gini |
| 2012/0286189 A1 | 11/2012 | Barthel et al. |
| 2013/0071640 A1 | 3/2013 | Szillat |
| 2014/0150242 A1 | 6/2014 | Kratel et al. |
| 2014/0230698 A1 | 8/2014 | Stepp et al. |
| 2015/0000259 A1 | 1/2015 | Dietz |
| 2016/0082415 A1 | 3/2016 | Drexel et al. |
| 2016/0084140 A1 | 3/2016 | Dietz |
| 2016/0223124 A1 | 8/2016 | Kulprathipanja et al. |
| 2016/0258153 A1 | 9/2016 | Koebel et al. |
| 2016/0326003 A1 | 11/2016 | Ishizuka et al. |
| 2017/0233297 A1 | 8/2017 | Albinus et al. |
| 2017/0268221 A1 | 9/2017 | Geisler et al. |
| 2018/0001576 A1 | 1/2018 | Koebel et al. |
| 2018/0065892 A1 | 3/2018 | Geisler et al. |
| 2019/0002356 A1 | 1/2019 | Hebalkar et al. |
| 2019/0276358 A1 | 9/2019 | Schultz et al. |
| 2019/0382952 A1 | 12/2019 | Geisler et al. |
| 2020/0031720 A1 | 1/2020 | Geisler et al. |
| 2020/0062661 A1 | 2/2020 | Geisler et al. |
| 2020/0124231 A1 | 4/2020 | Geisler et al. |
| 2021/0039954 A1 | 2/2021 | Numrich et al. |
| 2021/0269359 A1 | 9/2021 | Geisler et al. |
| 2021/0292233 A1 | 9/2021 | Numrich et al. |

FOREIGN PATENT DOCUMENTS

| | | | |
|---|---|---|---|
| CN | 107814552 | 3/2018 | |
| DE | 952 891 | 11/1956 | |
| DE | 25 33 925 | 2/1977 | |
| DE | 30 37 409 | 5/1982 | |
| DE | 199 48 394 | 2/2001 | |
| DE | 20 2007 013 074 | 3/2008 | |
| DE | 10 2007 020 716 | 11/2008 | |
| DE | 10 2007 031 635 | 1/2009 | |
| DE | 10 2007 042 000 | 3/2009 | |
| DE | 10 2007 051 830 | 5/2009 | |
| DE | 10 2008 005 548 | 7/2009 | |
| DE | 10 2008 036 430 | 2/2010 | |
| DE | 102010005800 | 7/2011 | |
| DE | 10 2010 040 346 | 3/2012 | |
| DE | 10 2013 016 705 | 4/2015 | |
| DE | 10 2014 203 091 | 8/2015 | |
| EP | 0 032 176 | 7/1981 | |
| EP | 0 340 707 | 11/1989 | |
| EP | 0 645 576 | 3/1995 | |
| EP | 0 647 591 | 4/1995 | |
| EP | 0 937 755 | 8/1999 | |
| EP | 1 700 824 | 9/2006 | |
| EP | 1988228 | 11/2008 | |
| EP | 1988228 A2 * | 11/2008 | ............ B28B 1/002 |
| EP | 2 028 329 | 2/2009 | |
| EP | 2 204 513 | 7/2010 | |
| EP | 2 910 724 | 8/2015 | |
| EP | 2621873 | 4/2018 | |
| EP | 3 403 818 | 11/2018 | |
| FR | 2873677 | 2/2006 | |
| GB | 919 018 | 2/1963 | |
| WO | WO 99/05447 | 2/1999 | |
| WO | WO 01/12731 | 2/2001 | |
| WO | WO 03/064025 | 8/2003 | |
| WO | WO 2005/028195 | 3/2005 | |
| WO | WO 2006/097668 | 9/2006 | |
| WO | WO 2010/126792 | 11/2010 | |
| WO | WO 2011/066209 | 6/2011 | |
| WO | WO 2011/076518 | 6/2011 | |
| WO | WO 2011/083174 | 7/2011 | |
| WO | WO 2012/041823 | 4/2012 | |
| WO | WO 2012/044052 | 4/2012 | |
| WO | WO 2012/049018 | 4/2012 | |
| WO | WO 2013/053951 | 4/2013 | |
| WO | WO 2014/044709 | 3/2014 | |
| WO | WO 2014/090790 | 6/2014 | |
| WO | WO 2014/095277 | 6/2014 | |
| WO | WO 2015/007450 | 1/2015 | |
| WO | WO 2015/193338 | 12/2015 | |
| WO | WO 2016/045777 | 3/2016 | |
| WO | WO 2016/171558 | 10/2016 | |
| WO | WO 2017/097768 | 6/2017 | |
| WO | WO 2017/102819 | 6/2017 | |

OTHER PUBLICATIONS

Mathias, et al., "Basic characteristics and applications of aerosil: 30. The chemistry and physics of the aerosil surface," *Journal of Colloid and Interface Science* 125:61-68 (1988).

Pajonk, et al., "Physical properties of silica gels and aerogels prepared with new polymeric precursors," *J. Non-Cryst. Solids* 186(2):1-8 (Jun. 1995).

Somana, Chotangada Gautham, "Evaluation of Aerogel Composite Insulations by Characterization and Experimental Methods," Thesis; B.Eng., R.V. College of Engineering, Banglore, India, (2012).

Schreiner, et al., "Intercomparison of thermal conductivity measurements on an expanded glass granulate in a wide temperature range," *International Journal of thermal Sciences* 95:99-105 (2015).

Ulmann's Encyclopedia of Industrial Chemistry, "Silica" chapter, published online on Apr. 15, 2008, DOI: 10.1002/14356007.a23_583.pub3.

U.S. Appl. No. 16/339,081, filed Apr. 3, 2019, US-2019/0276358 A1, Sep. 12, 2019, Schultz.

U.S. Appl. No. 16/478,169, filed Jul. 16, 2019, US-2020/0031720 A1, Jan. 30, 2020, Geisler.

U.S. Appl. No. 16/484,368, filed Aug. 7, 2019, US-2019/0382952 A1, Dec. 9, 2019, Geisler.

U.S. Appl. No. 16/605,342, filed Oct. 15, 2019, US-2020/0062661 A1, Feb. 27, 2020, Geisler.

U.S. Appl. No. 16/620,481, filed Dec. 6, 2019, US-2020/0124231 A1, Apr. 23, 2020, Geisler.

U.S. Appl. No. 16/978,164, filed Sep. 3, 2020, US-2021/0039954 A1, Feb. 11, 2021, Numrich.

U.S. Appl. No. 17/260,345, filed Jan. 14, 2021, Numrich.

U.S. Appl. No. 17/260,227, filed Jan. 14, 2021, Geisler.

U.S. Appl. No. 17/792,400, filed Jul. 31, 2022, Lazar.

U.S. Appl. No. 17/792,471, filed Jul. 13, 2022, Menzel.

Aquapanel Gmbh Knauf: "Optimales Wachstum auf mineralischer Basis. IHR ERFOLG WURZELT IN PERLIGRAN," p. 8; (Jan. 2018); URL:https://www.baustoffshop.de/pub/media/pdf/schuettung/PERLIGRAN_Broschuere_de.pdf.

U.S. Appl. No. 17/802,656, filed Aug. 26, 2022, Gärtner.

* cited by examiner

PROCESS FOR HYDROPHOBIZING SHAPED INSULATION-MATERIAL BODIES BASED ON SILICA AT AMBIENT PRESSURE

CROSS REFERENCE TO RELATED APPLICATIONS

The present application is US national stage of international application PCT/EP2019/068194, which had an international filing date of Jul. 8, 2019 and which was published on Jan. 23, 2020. The application claims the priority to EP 18184079.4, filed in on Jul. 18, 2018. The contents of the priority application is hereby incorporated by reference in its entirety.

The invention relates to a process for producing hydrophobic shaped bodies based on silicas having increased compressive strength and to the use thereof in thermal insulation and acoustic insulation.

Effective thermal insulation of houses, industrial plants, pipelines and suchlike is an important economic problem. The majority of insulation materials based on organic substances, such as polyurethane foams, are combustible and only usable at restricted temperatures. These disadvantages are not exhibited by the hitherto less widespread thermal-insulation materials based on inorganic oxides, for example highly porous silicon dioxide.

Such silicon dioxide-based thermally insulating materials are typically based on what are called the aerogels and on precipitated or fumed silicas. More detailed information relating to these silica types can, for example, be found in Ullmann's Encyclopedia of Industrial Chemistry, "Silica" chapter, published online on 15 Apr. 2008, DOI: 10.1002/14356007.a23_583.pub3.

Such silicon dioxide-based thermally insulating materials are typically non-water-repellent. However, the attachment and absorption of moisture in the core insulation material ought to be prevented. The causes of this moisture absorption are silanol groups which are situated on the silica and to which the water attaches. DE3037409 A1 discloses using alkali metal and/or alkaline earth metal stearates, waxes and fats to make core materials consisting of foamed perlites water-repellent. What occurs in particular with these substances is surface covering, which is known by the name "coating". Although the core materials treated in this way are repellent for liquid water, they absorb water vapour, in the form of air humidity, and thus result in a deterioration of the insulation properties. DE 4221716 A1, for example, discloses reacting fumed silicas with organosilanes and thereby making them hydrophobic, i.e. water-repellent.

However, such hydrophobic silicas cannot be sufficiently compacted and are not pressable, since the silica particles of the silanol groups no longer intermesh owing to the saturation with organic groups. A mixture comprising hydrophobic silica likewise does not give satisfactory results in press processes. However, pressing is necessary to ensure mechanical stability and for the application of such materials in thermal insulation.

EP0032176 A1 discloses thermal-insulation mixtures containing 10% to 80% by weight of a silica, 5% to 40% by weight of an opacifier, 1% to 10% by weight of an inorganic fibre and 1% to 20% by weight of an organosilicon compound of the formula $R^1{}_xSi(OR^2)_{4-x}$ or $R^1R^2R^3R^4Si$, where the substituents $R^1$-$R^4$ are especially alkyl groups. Such thermal-insulation mixtures are pressed to form sheets and then thermally treated at 1000° C., it being possible to reduce the shrinkage of the thermally treated sheet.

EP 1988228 A1 discloses building blocks and building systems having hydrophobic, microporous thermal-insulation materials, wherein said materials composed of a thermal-insulation mixture containing a silane of the formula $R_nSiX_{4-n}$, where n=1-3, or $(R_3Si)_2Y$, where Y=NH or O, $R=CH_3$ or $C_2H_5$, are, immediately after silane addition, pressed or compacted to form sheets or other shaped articles. The sheets or shaped articles produced in this way are permanently hydrophobic and have a thermal conductivity of 14 to 20 mW/(m*K).

The disadvantage of shaped thermal-insulation bodies produced in this way is that they have only a relatively low compressive strength and thus do not remain sufficiently stable mechanically. In particular, this is apparent at relatively low material densities of less than 200 g/l. This disadvantage limits the application of such sheets in the construction sector; from the perspective of applying thermal insulation, it would be desirable to produce the shaped thermal-insulation bodies, for example thermal-insulation sheets, with a density of less than 200 g/l and a compressive strength of greater than 60 kPa.

WO 2013013714 A1 discloses a process for hydrophobizing a hydrophilic-silica-comprising shaped thermal-insulation body in a pressure-resistant hydrophobization chamber with a gaseous organosilane. Although said process is highly suited to discontinuous production of hydrophobized thermal-insulation sheets, it can only be applied with technical difficulty to a continuous mode of production. In addition, the application of said process requires pressure-resistant apparatuses, which cause correspondingly high investment costs.

WO 2005028195 A1 discloses a continuous process for producing a thermal-insulation sheet from a microporous dry thermal-insulation material mixture by means of its continuous pressing. The thermal-insulation material mixture used in this process is hydrophilic, i.e. has not been treated with a hydrophobizing agent. A similar process for compacting a mixture based on a hydrophobized silica would not be technically realizable, since it would not be possible to compact the hydrophobized silicas to form a compact product such as a thermal-insulation sheet, as described in EP 1988228 A1.

It is an object of the present invention to provide a process for producing hydrophobic shaped bodies based on silicas, which process can be carried out in a technically simple and cost-effective manner and is transferable to a continuous mode of operation. It is a further object of the invention to produce hydrophobized thermally insulating shaped bodies, more particularly thermal-insulation sheets, which have a thermal conductivity of less than 50 mW/(m*K) and a compressive strength of greater than 60 kPa. It is an additional object to achieve the above-described thermal conductivity and compressive strength at a material density of less than 200 g/l.

These objects are achieved by a process for producing a hydrophobized shaped thermal-insulation body, comprising pressing or compacting a thermal-insulation mixture containing a silica, an IR opacifier, an organosilicon compound A and an organosilicon compound B, wherein organosilicon compound A is hexamethyldisilazane and organosilicon compound B corresponds to a substance of the formula $R_nSiX_{4-n}$, where R=hydrocarbyl radical having 1 to 18 carbon atoms, n=0, 1 or 2, X=Cl, Br or alkoxy group —$OR^1$ where $R^1$=hydrocarbyl radical having 1 to 8 carbon atoms, or organosilicon compound B corresponds to a silanol of the formula $HO[—Si(CH_3)_2O—]_mH$, where m=2-100.

The term "hydrophobic" or "hydrophobized" in the context of the present invention relates to the particles and shaped bodies having a low affinity for polar media such as water. By contrast, the hydrophilic particles or shaped bodies have a high affinity for polar media such as water. The hydrophobicity of the hydrophobized materials can typically be achieved by the application of appropriate nonpolar groups to the silica surface. The extent of the hydrophobicity of a hydrophobized material can be determined via parameters including its methanol wettability, as described in detail, for example, in WO2011/076518 A1, pages 5-6. In pure water, a hydrophobic silica separates completely from the water and floats on the surface thereof without being wetted with the solvent. In pure methanol, by contrast, a hydrophobic silica is distributed throughout the solvent volume; complete wetting takes place. When measuring methanol wettability in the present invention, what is determined is a maximum methanol content in a methanol/water test mixture at which the silica is partially wetted, i.e. after contact with the test mixture, approx. 50% of the silica used separates from the test mixture and remains unwetted. This methanol content in the methanol/water mixture in % by volume is called methanol wettability. The higher such methanol wettability, the more hydrophobic the material. The lower the methanol wettability, the lower the hydrophobicity and the higher the hydrophilicity of the material.

The hydrophobized shaped thermal-insulation body producible by the process according to the invention has a methanol wettability of methanol content greater than 5%, preferably of 10% to 80%, more preferably of 15% to 70%, especially preferably of 20% to 65%, most preferably of 25% to 60%, by volume in a methanol/water mixture.

The silica present in the thermal-insulation mixture is preferably selected from the group consisting of aerogels, xerogels, perlites, precipitated silicas, fumed silicas and mixtures thereof. It is particularly advantageous when a hydrophilic silica, i.e. one having a methanol wettability of less than 20% by volume methanol content in a methanol/water mixture, is used as starting material for the preparation of the thermal-insulation mixture. Most preferably, a fumed silica or a silicon dioxide aerogel is used.

Fumed silicas are prepared by means of flame hydrolysis or flame oxidation. This involves oxidizing or hydrolysing hydrolysable or oxidizable starting materials, generally in a hydrogen/oxygen flame. Starting materials that may be used for pyrogenic methods include organic and inorganic substances. Silicon tetrachloride is particularly suitable. The hydrophilic silica thus obtained is amorphous. Fumed silicas are generally in aggregated form. "Aggregated" shall be understood to mean that what are called primary particles formed at first during generation make strong interconnections in the further course of the reaction to form a three-dimensional network. The primary particles are very substantially free of pores and have free hydroxyl groups on their surface.

Silicon dioxide aerogels are produced by specific drying methods from aqueous silicon dioxide gels. Typically, the starting point is waterglass (sodium silicate) or silicon alkoxylates (organosilicates) such as tetraethyl orthosilicate (TEOS) and tetramethyl orthosilicate (TMOS) as silicon raw material, which form initially a silica sol and then a silica gel. They have a very high degree of pore structure and are therefore highly effective insulating materials.

The silica used can have a BET surface area of greater than 20 $m^2/g$, preferably of 30 to 500 $m^2/g$, particularly preferably of 50 to 400 $m^2/g$ and most preferably of 70 to 350 $m^2/g$. The specific surface area, also referred to simply as BET surface area, is determined according to DIN 9277: 2014 by nitrogen adsorption in accordance with the Brunauer-Emmett-Teller method.

The thermal-insulation mixture pressed or compacted in the process according to the invention contains at least one IR opacifier. Such IR opacifiers reduce the infrared transmittance of a thermal-insulation material and thus minimize the heat transfer due to radiation. Preferably, the IR opacifier is selected from the group consisting of silicon carbide, titanium dioxide, zirconium dioxide, ilmenites, iron titanates, iron oxides, zirconium silicates, manganese oxides, graphites, carbon blacks and mixtures thereof.

The particle size of the IR opacifiers used is generally between 0.1 and 25 μm.

The silica-containing thermal-insulation mixture used in the process according to the invention can further contain fibres and/or fine inorganic additives.

For reinforcement, i.e. for mechanical reinforcement, fibres can be added to the shaped body produced by the process according to the invention. Said fibres can be of inorganic or organic origin and can be present as constituent in the thermal-insulation mixture to an extent of 1% to 10% by weight. Examples of inorganic fibres which can be used are glass wool, stone wool, basalt fibres, slag wool and ceramic fibres consisting of melts of aluminium oxide and/or silicon dioxide and also of other inorganic metal oxides. Examples of pure silicon dioxide fibres are silica fibres. Examples of organic fibres which can be used are cellulose fibres, textile fibres and synthetic fibres. The diameter of the fibres is preferably 1-12 μm, particularly preferably 6-9 μm, and the length is preferably 1-25 mm, particularly preferably 3-10 mm.

Furthermore, inorganic filler materials can be added to the shaped body produced by the process according to the invention. It is possible to use various synthetically produced forms of silicon dioxide, such as precipitated silicas, arc silicas, $SiO_2$-containing fly ash produced via oxidation reactions of volatile silicon monoxide during electrochemical production of silicon or ferrosilicon. Also possible are silicas produced via leaching of silicates such as calcium silicate, magnesium silicate and mixed silicates such as olivine with acids. It is moreover possible to use naturally occurring $SiO_2$-containing compounds such as diatomaceous earths and kieselguhrs. It is likewise possible to add thermally expanded minerals such as perlites and vermiculites, and fine-particle metal oxides such as aluminium oxide, titanium dioxide, iron oxide.

The organosilicon compounds (silanes) used in the process according to the invention react with the silanol groups of the silica and thereby make the shaped thermal-insulation body water-repellent, i.e. hydrophobic. In the process of the invention, at least two different organosilicon compounds are used.

Organosilicon compound A, hexamethyldisilazane (HMDS), serves mainly for achieving a high degree of hydrophobicity of the shaped body formed.

Organosilicon compound B contributes to a relatively high mechanical strength of the shaped body formed. In this function, organosilicon compound B is to be capable of forming the chemical links between at least two free silanol groups. To this end, organosilicon compound B is to contain at least two reactive, i.e. hydrolysable or chemically substitutable, groups. Organosilicon compound B can be a substance of the general formula $R_nSiX_{4-n}$, where R=hydrocarbyl radical having 1 to 18 carbon atoms, preferably having 1 to 6 carbon atoms, n=0, 1 or 2, X=Cl, Br or alkoxy group —$OR^1$ where $R^1$=hydrocarbyl radical having 1 to 8 carbon atoms.

Particularly preferably, the organosilicon compounds B of the formula $R_nSiX_{4-n}$, that are used are alkoxysilanes (when X=alkoxy group) having 1 to 3 carbon atoms (methyl, ethyl, n-propyl or i-propyl). Most preferably, the organosilicon compounds B of the general formula $R_nSiX_{4-n}$, that are used are tetraalkoxysilanes (alternatively called tetraalkyl orthosilicates) such as tetramethoxysilane (tetramethyl orthosilicate, TMOS), tetraethoxysilane (tetraethyl orthosilicate, TEOS) and tetrapropoxysilane (tetrapropyl orthosilicate, TPOS).

Alternatively, organosilicon compound B can be a silanol of the general formula $HO[-Si(CH_3)_2O-]_mH$, where m=2-100. Such silanols, also called polydimethylsiloxanes or silicone oils with hydroxyl end groups, are usually produced by hydrolysis of dimethyldichlorosilane and have a molar mass of 162 to 7500 g/mol, a density of 0.76 to 1.07 g/ml and viscosities of 0.6 to 1 000 000 mPa*s.

When carrying out the process according to the invention, it is further advantageous when water is used in the preparation of the thermal-insulation mixture; preferably, the thermal-insulation mixture contains from 0.01% to 10% by weight of water. The water added can contribute to a quickened hydrophobization and solidification of the finished shaped body.

The thermal-insulation mixture used in the process according to the invention is prepared by mixing the relevant components. Preferably, said mixture is prepared by mixing 30% to 95% by weight, particularly preferably 50% to 90% by weight, of silica, 5% to 50% by weight, particularly preferably 7% to 25% by weight, of IR opacifier, 1% to 20% by weight, particularly preferably 2% to 10% by weight, of organosilicon compound A, 1% to 20% by weight, particularly preferably 2% to 10% by weight, of organosilicon compound B and 0.1% to 10% by weight, particularly preferably 0.5% to 5% by weight, of water; the proportions by weight are each based on the total mass of the thermal-insulation mixture.

The molar ratio organosilicon compound A:organosilicon compound B:water when preparing the thermal-insulation mixture can be 1:(0.1-20.0):(0-10); it is preferably 1:(1.0-10.0):(0.1-5).

Producing the hydrophobized shaped thermal-insulation body in accordance with the present invention preferably comprises the following process steps:

a) preparing a thermal-insulation mixture by mixing the individual components; b) pressing or compacting the thermal-insulation mixture; c) maturating the shaped thermal-insulation body formed and d) thermally treating (heat-treating) said shaped body.

The preparation of the thermal-insulation mixture can generally be done in various mixing units. However, planetary mixers are preferably used. The order of the addition of individual components to the mixture can be varied as desired. Preferably however, what is done last in the mixing sequence is the addition of the organosilicon compounds, particularly preferably in liquid form. Important here is an intensive, homogeneous mixing of the components to ensure the reaction (hydrophobization) from the "inside out". To this end, the liquid organosilicon compounds can be added to the remaining components of the thermal-insulation mixture by spraying for example. In principle, it is possible for the organosilicon compounds to also be added to the individual components such as silicas, opacifiers and other substitutes before they come into contact with the other components of the mixture. When fibres are used for the reinforcement of the shaped thermal-insulation bodies, it is advantageous to pre-mix the fibres first with a portion of the other mix components as a kind of master batch in order to thereby ensure a complete solubilization of the fibres. After fibre solubilization, the majority of the mix components is added.

The preparation of the thermal-insulation mixture can be done at a temperature of up to 70° C., preferably up to 50° C. and particularly preferably from 10° C. to 40° C. This can ensure that there is no or only minimal premature hydrophobization of the silica, which could impair later pressing.

The time between the addition of organosilicon compound A and organosilicon compound B to the thermal-insulation mixture and pressing or compacting of the thermal-insulation mixture is to be preferably limited for the same reason and can be up to 3 hours at most, but preferably 1 hour at most and particularly preferably 30 minutes at most.

The reaction of the organosilicon compounds with the silanol groups of the silica mainly occurs during the pressing or compacting procedure and immediately afterwards. If necessary, the reaction can be quickened or retarded, i.e. controlled, by means of supply of heat or removal of heat (cooling) and by means of what are known as accelerators, these being polar substances such as water, alcohols or hydrogen chloride, optionally under slight positive pressure.

After completion of the mixing process, the bulk density of the thermal-insulation mixture can be between 40-180 g/l, preferably 40-90 g/l, depending on the nature and the amount of the components. The flowability of the resultant thermal-insulation mixture is very good, meaning that it can be pressed, compacted, or else filled into the voids of hollow building blocks and pressed, to form a shaped thermal-insulation body, for example to form sheets, without any difficulties and in a homogeneous manner. When pressing or compacting to form a shaped thermal-insulation body, it is possible to set a certain density, and this substantially influences the thermal conductivity of the insulating material. The lower the density of the compacted material, the lower usually the thermal conductivity and the better the thermal-insulation properties. In the case of a density of less than approximately 150 g/l, the thermal-insulation properties can deteriorate, however.

After the thermal-insulation mixture has been pressed or compacted, the shaped thermal-insulation body formed can be maturated at a temperature of 20° C. to 80° C. within 1 to 24 hours. In the course of this, the hydrophobization reaction can proceed further and the mechanical and chemical properties of the resultant shaped thermal-insulation body can be improved.

After the shaped thermal-insulation body has been maturated, it can be heat-treated at a temperature of 90° C. to 200° C. within 1 to 24 hours. In the course of this, the hydrophobization can be completed and the excess amounts of components used or cleavage products of the hydrophobization process can be removed from the finished product.

For mechanical stabilization and for better handling, including dust-free handling, the hydrophobized shaped thermal-insulation body can be enveloped with nonwovens and films, preferably shrink films.

The resultant shaped thermal-insulation bodies, such as sheets or other shaped articles, are a continuous material and permanently hydrophobic.

The process of the invention makes it possible to produce a hydrophobized shaped thermal-insulation body which has a density of 50 to 300 g/l, preferably of 75 to 250 g/l, particularly preferably of 100 to 200 g/l;
  a compressive strength of greater than 60 kPa, preferably of 65 to 150 kPa, particularly preferably of 80 to 120 kPa and
  a thermal conductivity of less than 50 mW/(m*K), preferably of 5 to 45 mW/(m*K), particularly preferably of 10 to 40 mW/(m*K), most preferably of 15 to 35 mW/(m*K).

Mechanical strength (compressive strength) of the shaped thermal-insulation body producible by the process according to the invention can be determined by measuring the compressive stress arising under pressure in accordance with DIN EN 826:2013 "Thermal insulating products for building applications—Determination of compression behaviour".

The thermal conductivity of the shaped thermal-insulation body can be determined in accordance with EN 12667:2001 at a mean measurement temperature of 10° C., a contact pressure of 250 Pa under an air atmosphere and at standard pressure.

The invention further provides for the use of the hydrophobized shaped thermal-insulation body produced by the process according to the invention for acoustic insulation or thermal insulation. In particular, the hydrophobized shaped thermal-insulation body can be used to produce insulations in hollow building blocks, core insulations in multi-layered building blocks, core insulations for thermal-insulation-material composite systems for the internal and external insulation of buildings, insulations in double-leaf masonry, insulations in furnace construction and vacuum insulated panels.

Areas of use for said hydrophobized shaped thermal-insulation bodies produced by the process according to the invention include all applications in which the insulation materials are exposed to moisture or wetness.

EXAMPLES

Determination of Methanol Wettability

The sheet sample is ground by hand. The powder mixture is sieved across an 800 μm sieve, and the sieve residue is discarded. From the sieved sample, 200±5 mg are accurately weighed out into centrifuge tubes on an analytical balance. Using an Eppendorf pipette (10 ml), 8.0 ml of methanol/water mixture (from 0% by volume to 90% by volume of MeOH, the methanol content increasing in steps of 5% by volume) are added to each weighed amount. The tubes are closed securely and mixed homogeneously for 30 seconds in a Turbula mixer. This is followed by centrifuging the samples at 2500 rpm for 5 minutes.

The specified value for methanol wettability in % by volume relates to the maximum methanol content in a methanol/water test mixture at which the silica is partially wetted, i.e. after contact with the test mixture, approx. 50% of the silica used separates therefrom and remains unwetted on the surface of the solvent.

Determination of the Thermal Conductivity of the Sheets

The thermal conductivity of the shaped thermal-insulation body was determined in accordance with EN 12667:2001 at a mean measurement temperature of 10° C., a contact pressure of 250 Pa under an air atmosphere and at standard pressure.

Determination of the Mean Compressive Strength of the Sheets

The mean compressive strength of the sheets was determined by measuring the compressive stress arising under pressure in accordance with DIN EN 826:2013 "Thermal insulating products for building applications—Determination of compression behaviour". The mean value, ascertained from three measurements, is further referred to as mean compressive strength.

Sheet Production (Process Description)

Comparative examples 1~4 and examples 1-5

Mixture A consisted of 82% by weight of an Aerosil® 300 hydrophilic silica (BET=300 m$^2$/g, manufacturer: EVONIK Resource Efficiency GmbH), of 15% by weight of silicon carbide 1000F (Carsimet, manufacturer: Keyvest) and 3% by weight of short-cut silica fibres (ASIL® diameter 6 μm; L 6 mm, manufacturer: ASGLSOW® technofibre GmbH) and was prepared by mixing the individual components. Mixture A (3000 g) was mixed at 25° C. with the amounts of HMDS, water and TEOS specified in Table 1 in order to obtain a thermal-insulation mixture. The mixture maturation time (=the time after mixing until pressing) was, in this connection, less than 30 minutes; Table 2 provides more precise details in relation to the mixing time and mixture maturation time for the individual examples and comparative examples.

The pressing of the previously prepared thermal-insulation mixture to form a sheet having dimensions of approx. 30×30×2 cm was done at 25° C. within 20 seconds in a spindle press; the hold time after pressing was 100 seconds. The pressing was followed by sheet maturation at 25-80° C. within 1-24 h in a closed system. More precise sheet maturation time and temperature are specified in Table 2. After maturation, the sheets were heat-treated at 165° C. within 24 h in an open system and left to cool down to 25° C. (room temperature).

The density, compressive strength, methanol wettability and thermal conductivity of the sheets thus produced are summarized in Table 3.

TABLE 1

Starting materials for the preparation of the thermal-insulation mixtures

| | Mixture A [g] | HMDS [g] | Water [g] | TEOS [g] |
|---|---|---|---|---|
| Comparative Example 1 | 3000 | 246 | 0 | 0 |
| Comparative Example 2 | 3000 | 246 | 49 | 0 |
| Comparative Example 3 | 3000 | 0 | 49 | 246 |
| Example 1 | 3000 | 197 | 49 | 197 |
| Example 2 | 3000 | 197 | 98 | 197 |
| Example 3 | 3000 | 197 | 98 | 197 |
| Example 4 | 3000 | 197 | 98 | 197 |
| Example 5 | 3000 | 197 | 98 | 197 |
| Comparative Example 4 | 3000 | 197 | 98 | 0 |

TABLE 2

Process parameters

| | Mixing time [min] | Mixture maturation time [min] | Sheet maturation [h] | Sheet maturation temp. [° C.] |
|---|---|---|---|---|
| Comparative Example 1 | 7 | 15-30 | 1 | 25-80 |

TABLE 2-continued

Process parameters

|  | Mixing time [min] | Mixture maturation time [min] | Sheet maturation [h] | Sheet maturation temp. [° C.] |
|---|---|---|---|---|
| Comparative Example 2 | 7 | 15-30 | 1 | 25-80 |
| Comparative Example 3 | 7 | 15-30 | 4 | 25-80 |
| Example 1 | 4 | <15 | 4 | 50 |
| Example 2 | 4 | <15 | 1 | 25 |
| Example 3 | 4 | 15-30 | 1 | 25 |
| Example 4 | 4 | <15 | 4 | 50 |
| Example 5 | 4 | 15-30 | 4 | 50 |
| Comparative Example 4 | 4 | 15-30 | 4 | 50 |

TABLE 3

Material properties of the sheets

|  | Density [g/l] | Mean compressive strength [kPa] | MeOH wettability [% by volume MeOH] | Thermal conductivity [mW/m*K] |
|---|---|---|---|---|
| Comparative Example 1 | 142 | 17 | 20 |  |
| Comparative Example 2 | 179 | 51 | 35-40 |  |
| Comparative Example 3 | 159 | 93 | 0 |  |
| Example 1 | 168 | 74 | 45 | 19.1 |
| Example 2 | 180 | 113 | 40 | 18.7 |
| Example 3 | 175 | 89 | 40 |  |
| Example 4 | 172 | 98 | 52 | 18.3 |
| Example 5 | 171 | 85 | 47 |  |
| Comparative Example 4 | 171 | 69 | 53 |  |

All sheets except for the one from Comparative Example 3 were hydrophobic and had a methanol wettability of 20% by volume of MeOH. This can be attributed to the action of organosilicon compound A (HMDS). The use of HM DS (organosilicon compound A) without TEOS (organosilicon compound B) led to the resultant sheets having insufficient mechanical strength (mean compressive strength) (Comparative Examples 1, 2, 4). The mean compressive strength of the sheets from Comparative Examples 1, 2 and 4 was lower than for the sheets from Examples 1-5, where HMDS (organosilicon compound A), TEOS (organosilicon compound B) and water were used. Comparative Example 4 was carried out without TEOS, but otherwise under the same conditions as Example 5. This led to a substantially lower compressive strength of the sheet in Comparative Example 4.

The invention claimed is:

1. A process for producing a hydrophobized shaped thermal-insulation body,
   comprising pressing or compacting a thermal-insulation mixture:
   wherein the thermal-insulation mixture comprises:
   a) 30% to 95% by weight of silica;
   b) 5% to 50% of an IR opacifier;
   c) 1% to 20% by weight of organosilicon compound A, wherein organosilicon compound A is hexamethyldisilazane (HMDS);
   (d) 1% to 20% by weight of organosilicon compound B, wherein organosilicon compound B is a substance of formula $R_nSiX_{4-n}$, wherein:
   R=hydrocarbyl radical having 1 to 18 carbon atoms;
   n=0, 1 or 2;
   X=Cl, Br or alkoxy group —$OR^1$ wherein $R^1$=hydrocarbyl radical having 1 to 8 carbon atoms;
   or organosilicon compound B corresponds to a silanol of the formula $HO[-Si(CH_3)_2O-]_mH$, where m=2-100; and
   e) 0.1% to 10% by weight of water;
   and wherein the hydrophobized shaped thermal-insulation body formed has a density of 50 to 300 g/l and a compressive strength of 65 to 150 kPa.

2. The process of claim 1, wherein the silica is selected from the group consisting of: aerogels: xerogels; perlites; precipitated silicas; fumed silicas; and mixtures thereof.

3. The process of claim 1, wherein the IR opacifier is selected from the group consisting of: silicon carbide; titanium dioxide; zirconium dioxide; ilmenites; iron titanates; iron oxides; zirconium silicates; manganese oxides; graphites; carbon blacks; and mixtures thereof.

4. The process of claim 1, wherein the molar ratio of organosilicon compound A to organosilicon compound B to water when preparing the thermal-insulation mixture is 1:(0.1-20.0):(0.2-10).

5. The process of claim 1, wherein the thermal-insulation mixture contains 1% to 10% by weight of a fibre.

6. The process of claim 1, wherein the preparation of the thermal-insulation mixture is done al a temperature of 10° C. to 40° C.

7. The process of claim 1, wherein the time between the addition of organosilicon compound A and organosilicon compound B to the thermal-insulation mixture and pressing or compacting of the thermal-insulation mixture is 30 minutes at most.

8. The process of claim 1, wherein, after the thermal-insulation mixture has been pressed or compacted, the shaped thermal-insulation body formed is maturated at a temperature of 20° C. to 80° C. within 1 to 24 hours.

9. The process of claim 8, wherein, after the shaped thermal-insulation body has been maturated, it is heat-treated at a temperature of 90° C. to 200° C. within 1 to 24 hours.

10. The process of claim 2, wherein the IR opacifier is selected from the group consisting of: silicon carbide; titanium dioxide; zirconium dioxide; ilmenites; iron titanates; iron oxides; zirconium silicates; manganese oxides; graphites; carbon blacks; and mixtures thereof.

* * * * *

UNITED STATES PATENT AND TRADEMARK OFFICE
CERTIFICATE OF CORRECTION

PATENT NO. : 11,987,528 B2
APPLICATION NO. : 17/260371
DATED : May 21, 2024
INVENTOR(S) : Uwe Albinus et al.

It is certified that error appears in the above-identified patent and that said Letters Patent is hereby corrected as shown below:

On the Title Page

Inventors (72)
Column 1
Line 3          Delete "Gartner," and insert --Gärtner--

In the Specification

Column 4
Lines 57-58          Delete "(HM DS)," and insert --(HMDS),--

Column 5
Line 7          Delete "$R_n SiX_{4-n}$," and insert --$R_n SiX_{4-n}$--
Line 10          Delete "$R_n SiX_{4-n}$," and insert --$R_n SiX_{4-n}$--

Column 8
Line 11          Delete "1~4" and insert --1-4--

Column 9
Line 39          Before "20%", insert --≥--
Line 41          Delete "HM DS" and insert --HMDS--

Signed and Sealed this
Twenty-ninth Day of October, 2024

Katherine Kelly Vidal
*Director of the United States Patent and Trademark Office*